Patented Feb. 26, 1929.

1,703,220

UNITED STATES PATENT OFFICE.

HENRY BERLIN, OF NEW YORK, N. Y., ASSIGNOR TO INTERNATIONAL PATENTS DEVELOPMENT COMPANY, OF WILMINGTON, DELAWARE, A CORPORATION OF DELAWARE.

MANUFACTURE OF PINACOL.

No Drawing. Application filed December 20, 1926. Serial No. 156,069.

My invention relates to the production of tetramethylglycol

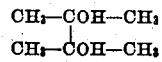

or pinacol, sometimes known as pinacone, and its objects are to provide novel and practically useable methods (1) of preparing pinacol hydrate by reacting acetone or its homologues with certain other substances or their equivalents, as hereinafter set forth; (2) of preparing anhydrous pinacol directly without first producing the hydrate.

I am aware of United States Patent No. 1,068,777 granted to August Jonas and Eduard Tschunkur, assignors to Farbenfabriken vorm. Friedr. Bayer & Co., July 29, 1913, and United States Patent No. 1,079,916 granted to the same parties on November 25, 1913; but after careful experiment with the processes disclosed or purporting to be disclosed, in these patents, I have found that said processes are unworkable and that the agents and manipulations specified in said patents, when employed in the manner directed, will not give the results claimed or any other useful result. Long experimentation with the reactions here concerned has convinced me that in order to successfully produce pinacol from acetone or its homologues it is necessary to use agents and manipulations thereof substantially as hereinafter described. The invention is based upon this discovery.

(1) The following is a specific example of the method which I have devised for producing pinacol hydrate.

1600 grams of acetone $(CH_3)_2CO$ is placed in a vessel provided with an agitator and having a reflux condenser, with 80 grams of aluminum and from 70 to 100 grams of carbon tetrachlorid—$CCl_4$—and the mixture boiled by application of heat to the vessel. The amount of the carbon tetrachlorid introduced initially is important. If substantially less than 70 grams is used the reaction ordinarily does not take place and if in exceptional cases it does take place it is very slow in starting and furnishes insignificant yields, even from the laboratory point of view. If the amount is much in excess of 100 grams, say by 10 or 15 grams, the reaction is too violent. After the mixture has boiled for two or three minutes, there is added at one time 35 grams of crystalline mercuric chloride—$HgCl_2$—and the boiling is continued for ten to fifteen minutes. The heat is then removed and the reaction continues exothermically. When most of the $CCl_4$ has been consumed and the reaction slows down 10 grams of $CCl_4$ is added which livens up the reaction. The carbon tetrachlorid is thereafter added intermittently in 10 gram quantities when the reaction slows down and until its addition ceases to stimulate reaction. The total amount of $CCl_4$ used may be about 175 grams. The carbon tetrachlorid, added after the reaction has slowed down, may be introduced continuously in smaller quantities instead of intermittently in the quantities noted. Heat is then applied to insure complete reaction and the substance is cooled or allowed to cool to from 40° to 50° centigrade, and 330 grams of water is run into the batch and the material agitated, then boiled for from one-half to one hour and thereafter cooled and filtered. Preferably the filter cake is washed with acetone to increase the yield. The filtrate and liquid from the washing of the filter cake are combined and evaporated in the presence of sodium carbonate, 2 to 3 grams of sodium carbonate being preferably employed, the evaporation being at atmospheric pressure and continued until the temperature of the heated substances is about 80° centigrade and the temperature of the vapors distilling over is from 70° to 72° centigrade. 150 grams of ice water is then added to the residue and on cooling to 15° centigrade pinacol hydrate

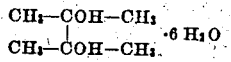

separates out as crystals. These crystals are washed with carbon tetrachlorid to remove impurities. The crystals will be snow-white and very pure, the yield being, according to my experience, about 65% of the theoretical, based on the aluminum used. The excess of carbon tetrachlorid and acetone driven off by distillation can be saved and re-used.

While my experiments have been confined to the use of acetone, it should be possible, on theoretical grounds, to use any of the homologues of acetone. In place of mercuric chloride any soluble mercury salt soluble in acetone (or its homologue if used) and decomposable by aluminum can be used.

The acetone ingredient can be used in larger or smaller proportions than indicated but this will, in the first case, give an unnecessary excess without any beneficial result and in the second case will furnish a product of undesirable consistency and appearance. The aluminum may be granulated, in shavings, or in sheets. I have found that the use of powdered aluminum, contrary to the statement of the patents above referred to, is not as satisfactory.

To produce anhydrous pinacol from pinacol hydrate, prepared as above or otherwise, 100 grams of pinacol hydrate is melted, for example, on a water bath, and is mixed with 100 grams of a 50% caustic soda solution and the mixture while warm agitated for ten to fifteen minutes and then allowed to settle. The material separates into two layers, the upper layer consisting of anhydrous pinacol with possibly some impurities. This layer may be taken off and distilled to remove the impurities. On cooling the distillate will crystallize as pure, snow-white prismatic crystals. In place of caustic soda one may use potassium hydroxide, or any other alkaline dehydrating agent which does not dissolve pinacol or react with pinacol.

(2) To produce anhydrous pinacol directly, without, that is, first producing the hydrate, the process as above outlined for the production of the hydrate is followed through the adding of the carbon tetrachlorid in 10 gram increments. The material is then cooled and a 50% solution of caustic soda is added in an amount twice the equivalent of the aluminum used. The mixture when allowed to stand after preliminary stirring will separate into layers, the upper one of which consists of an acetone solution of pinacol. This is syphoned off and fractionally distilled in vacuo.

The above description is based upon batches of relatively small size. It will be understood that when larger quantities of material are handled certain details of the operations, such as the duration of the heating and the like, may have to be varied. These and other modifications will be entirely within the ordinary skill of the trained worker. In such respects, therefore, the method may be modified considerably without departure from the principles of the invention and all such modifications, within the scope of the appended claims, are to be considered as within the contemplation of my invention.

In carrying out process (2), potassium hydroxide, or any other alkaline dehydrating agent which does not react or mix with pinacol may be employed instead of caustic soda. The proportions of the ingredients may also be varied, to some extent, without defeating the aims in view, but the proportions given above are deemed best.

I claim:

1. Method of producing pinacol by reacting together acetone, or its homologues, aluminum and a mercury salt soluble in the ketone and decomposable by aluminum, which comprises using carbon tetrachlorid as a reaction producing agent, and introducing the same into the mixture of the other ingredients intermittently, one portion initially and the other portions as the reaction slows down so as to prevent violence of reaction, and thereafter decomposing the reaction product and separating out the solution of pinacol.

2. Method of claim 1 in which the ingredients are in substantially the following proportions by weight: acetone 160 parts; aluminum 8 parts; mercuric chloride 3½ parts; and carbon tetrachlorid, introduced initially, 7 to 10 parts, with subsequent additions of the carbon tetrachlorid of 1 part each, as the reaction slows down, to a total of about 17½ parts.

3. Method of claim 1 in which the ingredients are in substantially the following proportions by weight: acetone 160 parts; aluminum 8 parts; mercuric chloride 3½ parts; and carbon tetrachlorid, introduced initially, 7 to 10 parts with subsequent additions of the carbon tetrachlorid of one part each, to a total of about 17½ parts; and in which the reaction product of acetone, aluminum, mercuric chloride and carbon tetrachlorid is cooled, 330 parts of water added, the mixture boiled, cooled, filtered, evaporated in the presence of sodium carbonate, to remove chiefly acetone and excess of carbon tetrachlorid, and the residue mixed with 150 parts of water and crystallized.

4. Method of claim 1 in which the ingredients are in substantially the following proportions by weight: acetone 160 parts; aluminum 8 parts; mercuric chloride 3½ parts; and carbon tetrachlorid, introduced initially, 7 to 10 parts with subsequent additions of the carbon tetrachlorid of one part each, to a total of about 17½ parts, and in which the reaction product of acetone, aluminum, mercuric chloride and carbon tetrachlorid is cooled, 330 parts of water added, the mixture boiled, cooled, filtered, the filter cake washed with acetone and the filtrate and washings of the filter cake evaporated in the presence of sodium carbonate to remove chiefly acetone and excess of carbon tetrachlorid, and the residue mixed with 150 parts of water and crystallized.

HENRY BERLIN.